Jan. 15, 1957  L. J. SCHILLING  2,777,420
MILKING APPARATUS
Filed Feb. 16, 1951.  2 Sheets-Sheet 1

Inventor:
Lorell John Schilling,
By Schroeder, Merriam,
Hofgren & Brady, Attys.

Jan. 15, 1957 L. J. SCHILLING 2,777,420
MILKING APPARATUS
Filed Feb. 16, 1951 2 Sheets-Sheet 2
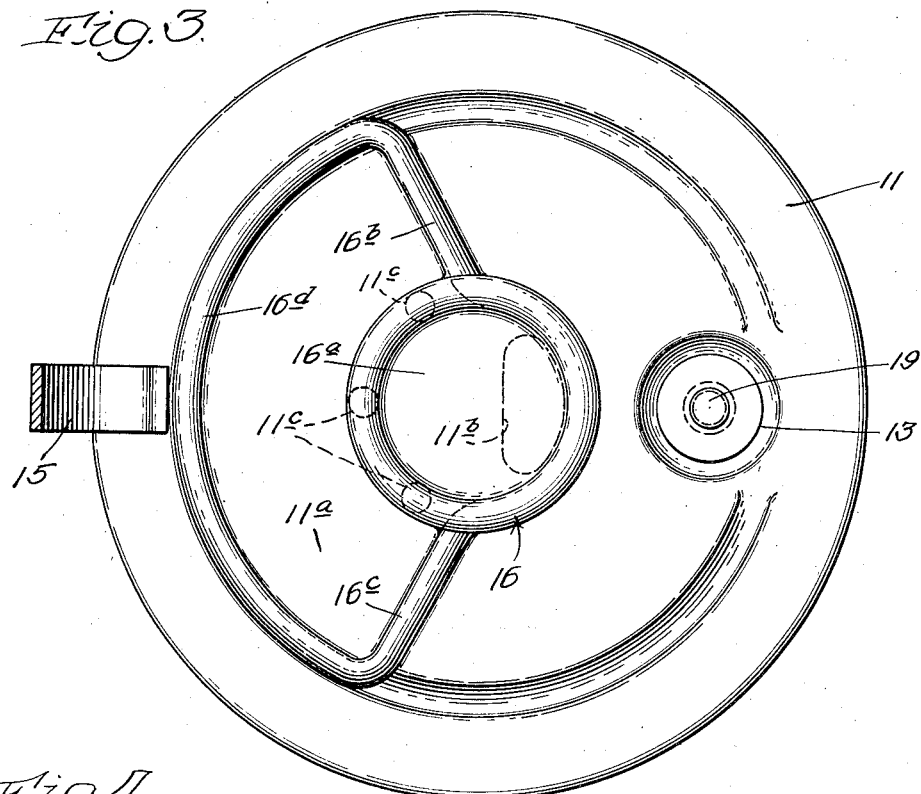
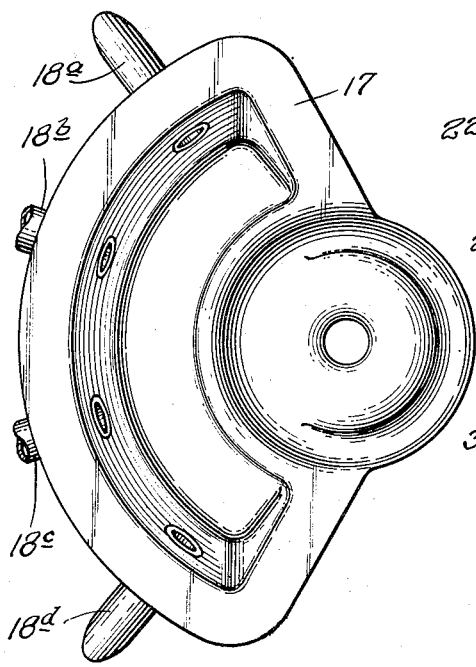
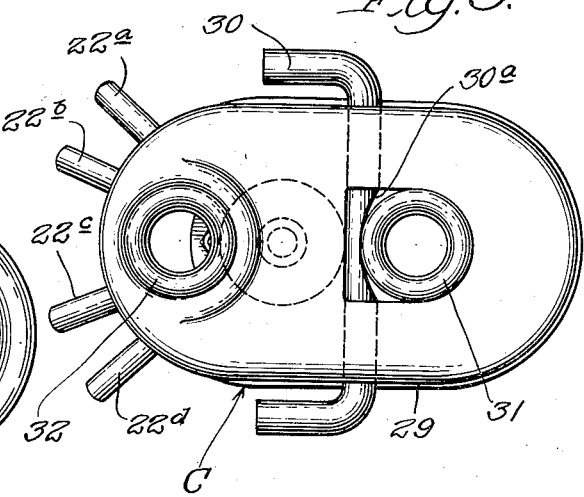
Inventor:
Lorell John Schilling,
By Schroeder, Merriam,
Hofgren & Brady, Att'ys.

United States Patent Office 2,777,420
Patented Jan. 15, 1957

2,777,420

MILKING APPARATUS

Lorell John Schilling, Galesville, Wis., assignor to Schilling Electric Company, a corporation of Wisconsin Application February 16, 1951, Serial No. 211,381

9 Claims. (Cl. 119—14.39)

This invention relates to milking apparatus, and more particularly to an improved arrangement for controlling milk flow and vaccum conditions around the teats in a milking system.

One feature of this invention is that it provides apparatus effecting more rapid and complete milking; another feature of this invention is that it materially reduces the vacuum applicable to the ends of the teats, and such portions of the teat surface as may not be covered by the collapsed inflation, during the "rest" or "massage" portion of the cycle of inflation operation effected by the pulsator; yet another feature of this invention is that it permits the use of a relatively high vacuum on the teats during the milk withdrawal period and an increase in the relative length of the milk withdrawal period with respect to the rest period, with improved "rest" or massage action on the teats.

Other features and advantages of this invention will be apparent from the following specification and the drawings, in which:

Figure 3 is a view of the lower portion of the lid structure and associated flexible sealing and valve member element associated therewith, with the top portion and pulsator removed from the lower portion of the lid structure;

Figure 4 is a bottom view of the milk nipple connector portion of the structure, one of the upper pieces removed from the showing of Figure 3; and Figure 5 is a bottom view of the pulsator, another of the portions removed from the showing in Figure 3.

Figure 1:
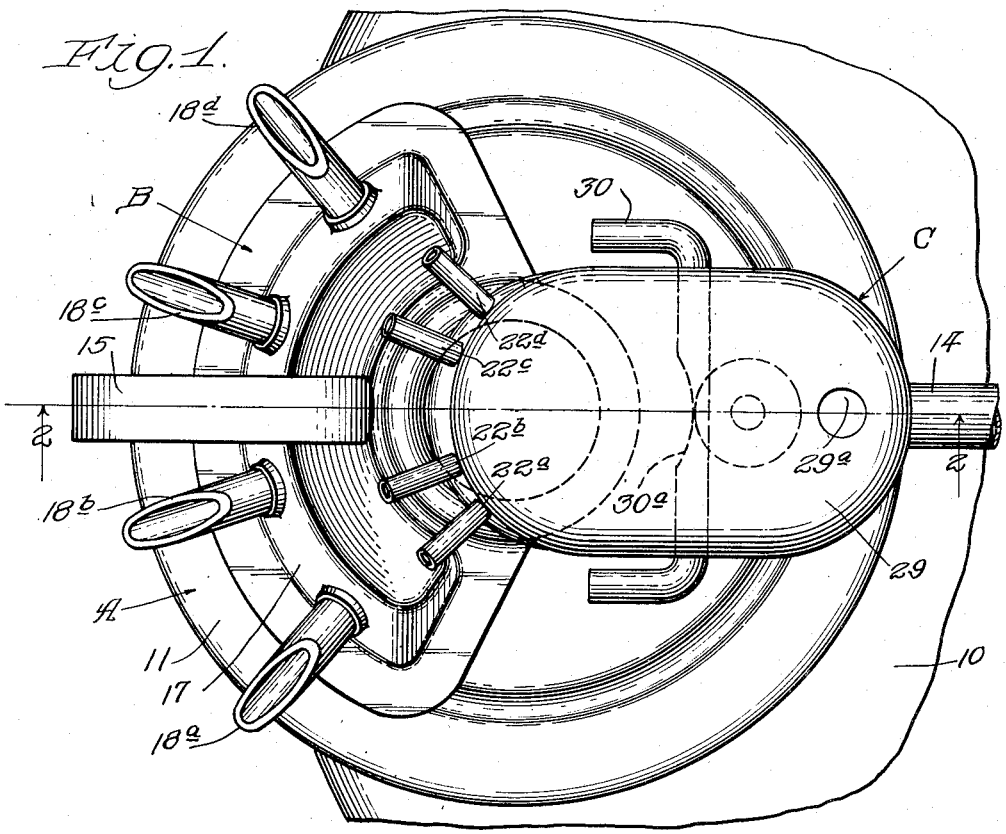
Figure 1 is a top plan view of a lid and pulsator assembly embodying my inventions together with a fragmentary portion of the pail of the milker with which the lid is illustrated.

The particular embodiment of my inventions illustrated herewith is shown as designed for and in use on the bucket or pail of a suspended milker of the kind more fully disclosed and described in McCornack Patent 1,859,-213, for example. It will be understood, however, that the lid structure here shown may be used on the bowl of a carry-away milking system of the kind more fully illustrated and described in Thomas applications Ser. No. 44,948, filed August 18, 1948, replaced by continuation application, Serial No. 237,922, now Patent 2,709,416, issued January 6, 1955, and Ser. No. 208,869, filed February 1, 1951 and abandoned in favor of continuation application, Serial No. 219,962, filed April 6, 1951 now Patent 2,706,965, issued October 7, 1954; and that the inventions thereof may be embodied in somewhat different form in other systems and apparatus for milking, of all known types.

In double acting milking systems known to applicant, systems which have been in use for several decades, it has been customary to maintain a steady vacuum within the milk tubes and interior of the inflations, and to alternate vacuum and atmospheric conditions around the exterior of the inflations, between them and the shell of the teat cup assemblies. This resulted in alternately contracting and expanding the inflations around the teats during the milking operation, the expanded portion of the cycle of operation permitting full application of vacuum in the milk tubes to the ends of the teats and effecting withdrawal of milk; and the contracted portion of the cycle providing what is generally termed a "rest" or "massage" period blocking withdrawal of milk and partially protecting the teat from the vacuum otherwise existing entirely around it and through the opened teat canal in the interior of the teat. These rest and withdrawal periods have normally been of approximately equal length, with the cycle of operations being repeated in the neighborhood of 40 to 60 times per minute.

In addition to the milk withdrawal action provided by the continuous application of vacuum within the milk tubes and the alternate expansion and contraction of the inflations, or flexible portions of the teat cup assemblies, efficiency has heretofore been further improved in a suspended bucket milker of the kind illustrated in the drawings as one embodiment of my invention by providing an intermittent downward and forward tug and pull on the teats during milking, as is more fully set forth and described in the above mentioned McCornack patent and the McCornack method Patent 2,050,356.

Such milkers have been known in the art for doing a fast and efficient job of milking and for minimizing undesired effects on the teats, such milkers usually being operated in the field with about 13 inches of vacuum within the milk tubes and about 15 inches of vacuum alternating with atmosphere around the exteriors of the inflations. I have found, however, that by providing means resulting in the application of a greatly reduced vacuum applicable to the end of the teat during the rest period, and having the full milking vacuum applicable to the end of the teat only during the withdrawal period, I am able substantially to increase the ratio of withdrawal period to rest period, and to increase the amount of vacuum used in milking, if desired, thus increasing the speed and efficiency of the milking operation, with improved periodic rest action and without increased irritation on the teat heretofore attendant on such changes. The result is that, with the use of my invention illustrated and described here, cows can be regularly milked out in about 2 minutes and 20 or 30 seconds as against the 3 minutes normally required for a milker of the type illustrated in McCornack Patent 1,859,213; and this increased milking speed can be achieved with no irritation to the teats, or substantially none.

In the particular embodiment of my invention illustrated herewith as representative of one form of milking system in which my inventions may be used, a milker pail 10, which may for example, be of the kind illustrated in McCornack Patent 1,859,213, has in the top thereof an opening surrounded by the rolled bead or flange 10a. The opening in the pail or bucket is closed by the lid structure having my invention embodied therein, and which may replace on the milker bucket a lid of the kind illustrated in the aforesaid McCormack Patent, or of the kind illustrated in Thomas application 9,088, filed February 18, 1948, now Patent 2,610,609, issued February 28, 1952.

Figure 2:
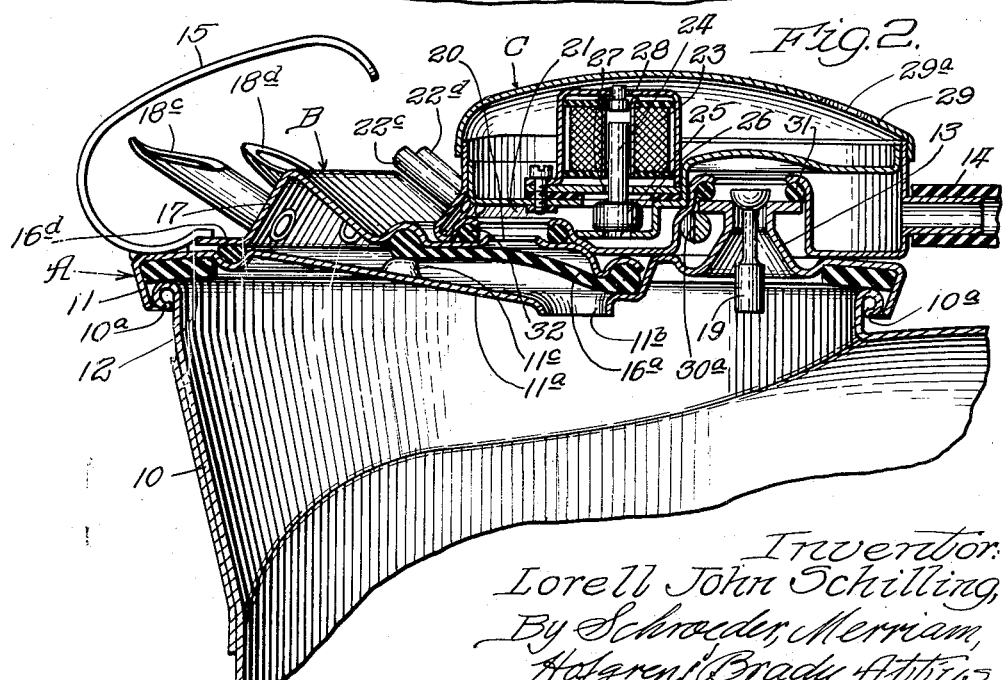
Figure 2 is a vertical sectional view of the parts shown in Figure 1.

Referring now more particularly to Figures 1 and 2 the lid structure is shown as comprising three principal parts here identified as A, B and C. The part A comprises a lower lid section 11, preferably formed of a sheet metal such as stainless steel having a channel around its outer edge forming a recess receiving the gasket 12, which serves to provide a vacuum tight seal between the lid assembly and the head 10a of the pail, as may be best seen in Figure 2. The right hand portion of the lid (speaking with respect to the position of the parts as illustrated in Figures 1 and 2) is provided with a pulsator post 13 which supports the pulsator C and which acts as a vacuum passageway between the interior of the pail and passageways in the pulsator communicating with the vacuum hose 14, which is connected to any appropriate source of vacuum as a stall cock on a vacuum line in turn connected to a vacuum pump. A handle 15 is provided for convenience in lifting the lid assembly.

As may be best seen in Figures 2 and 3, the lower member 11 of the lid assembly is provided with a sloping forward portion 11a, terminating in an opening 11b adapted to communicate with the interior of the bucket in the embodiment illustrated, or with the remainder of the milk delivery passageway in a carry-away system. On the lower plate member 11, as illustrated here, is a rubber member 16 comprising a combined valve diaphragm and gasket arrangement. The center portion is a round diaphragm member 16a with thickened edge portions for gasket purposes, and extending from this, and integral with it merely for convenience, is an open portion comprising the arms 16b and 16c and the forward arcuate portion 16d. This diaphragm and gasket member 16 is adapted to receive and seal to the lower plate member 11, a connector member here identified as 17. This member is formed upwardly in an arcuate portion having the milk tube connector nipples 18a—18d mounted thereon, this particular formation adjacent the connector nipples being more particularly described and claimed in said Thomas application 9088. Each such nipple is adapted to have slipped thereover the milk tube portion of the inflation of one of the four teat cup assemblies, so that milk withdrawn from the teats flows through the milk tube and connector nipple and, as may be best seen in Figure 2, along the top of the inclined portion 11a of the lower plate to the opening 11b, where it discharges into the bucket 10. Bump or "humped-up" portions 11c are shown as supporting the forward enlarged end of the diaphragm 16a so that milk can always flow under this forward end. It will thus be apparent that milk flow out of the forward chamber provided by the arcuate raised portion of the plate 17, and the connection of this chamber (hereinafter sometimes termed the "milking chamber") with the vacuum existing in the remainder of the milk flow passageway can be controlled by flexing of the diaphragm valve member 16a. When the diaphragm valve member 16a is in the position illustrated in Figure 2, vacuum existing in the bucket 10 is applicable through the milk chamber, the connector nipples and the milk tubes on the teats, to a full and unrestricted extent; but if the diaphragm valve member is flexed downwardly to cover over and close the opening 11b, there is no longer any open communication between the inflations and milk chamber and the remainder of the milk delivery passageway, so that the vacuum conditions within the inflations can be greatly reduced.

This reduction in vacuum during the rest period is effected by closing the valve and blocking the milk passageway opening 11b at or about the time of the commencement of contraction of the inflations by the pulsator, preferably at or slightly before this commencement of contraction. When the valve is closed the contraction of the inflations reduces the volume and correspondingly reduces the vacuum. That is, if 13 inches of vacuum existed in the milk chamber, milk tubes and interior of the body portions of the inflations when they were fully expanded, and the contraction of the inflations reduces the total of that volume to approximately half, the vacuum existing within the milk chamber and milk tubes will be dropped to a very low figure. In order to have this desired result achieved by my improved method and apparatus, I find it desirable to keep the size of the milk chamber small, so that it and the milk tubes will have a volume of the same order, and preferably approximately the same as the volume of the interior of the body portion of the four inflations when they are fully expanded.

It will thus be apparent that by flexing the diaphragm 16a acting as a valve member to open and close communication through the opening 11b, and by proportioning the volumes as described, the full vacuum existing in the pail will be applicable through the milk tubes only during the milk withdrawing or expanded portion of the inflation operation cycle; and that during the contracted or rest period, the vacuum will be reduced to a very low level as a function of the change in volume beyond the positively operated valve, resulting in the maximum of "rest" and the minimum of irritation of the teat.

While the valve arrangement may be actuated in any desired manner, I am here disclosing it as pneumatically actuated by an electrically operated pulsator arrangement comprising the unit C. This unit includes openings communicating with the lid post opening 13 and the check valve 19 therein, and an opening 20 immediately above the diaphragm element 16a. Immediately above this opening 20 is a chamber 21 communicating with the pulsator nipples 22a to 22d. These nipples are adapted to receive the tubes leading from the shells of the teat cup assemblies and to provide the alternate pressure conditions within the shell but to the exterior of the inflation.

A solenoid 23 is adapted to raise a magnetic plunger 24 when energized, this plunger carrying a pilot valve 25 at its lower end. In the position illustrated in Figure 2, this pilot valve is adapted to seat on and close an opening 26 in communication with vacuum at all times through the vacuum hose 14, the area beneath this opening 26 communicating with a rather large space or chamber surrounding the post 13. When the plunger 24 and pilot valve 25 are raised by energization of the solenoid 23, the pilot valve member is adapted to seat on and close off another opening 27, the space above the plate having the opening 27 being open on each side of the solenoid mounting strap 28 to the area under the cap 29 and through the opening 29a to atmosphere in the form illustrated.

The pulsator is adapted to be mounted on the lid and all the parts of the lid locked together by an arrangement here illustrated as comprising a swingable lever member 30 having a partially cut-away center portion 30a. Suitable pulsator mounting gaskets are here shown as comprising the small rubber rings 31, providing a seal adjacent the post, and 32 providing a seal around the opening 20. In assembling the lid, the latching member 30 would be thrown to a position as illustrated in Figure 5, and the pulsator and other parts placed together in the relationship shown in Figure 2. Flipping over the ends of the latching bar or member 30 then turns the partially cut-away portion to a locking position beneath the post 13, as illustrated in Figure 2, holding the parts together mechanically. Application of vacuum within the pulsator and bucket assists in this holding operation and makes a tight and unitary lid assembly during operation.

The solenoid 23 may be energized and deenergized in desired timed sequence of operations by any suitable means. As an example of this, I may use a timer of the character illustrated in my Patent No. 2,534,927 which issued December 19, 1950, with the electrical impulses generated in timed relationship being used to energize the solenoid and operate the electric pulsator illustrated at a desired and adjustable rate of operation.

Referring now more particularly to Figure 2, it will be assumed that the expansion portion of inflation operation or pulsator cycle has just been completed and the solenoid 23 has just been deenergized. Movement of the pilot valve 25 to the position illustrated in Figure 2 closes the vacuum opening 26 and permits atmospheric air to pass through the openings 29a, 27 and 20 to the upper surface of the diaphragm element 16a, as well as existing in the chamber 21 in communication with the pulsator hoses. However, since there is vacuum beneath the diaphragm element 16a, the first air entering the space in the chamber 21 will drop the pressure and cause the diaphragm element to move down onto the plate 11 and tightly close the opening 11b, this taking place before air has flowed out along the pulsator hoses sufficiently to make any appreciable change in pressure conditions around the exterior of the inflations. Almost instantly, after closing of the valve diaphragm element 16a, however, pressure around the inflations rises sufficiently that they start to contract in the normal manner; and as explained heretofore, this contraction reduces the volume beyond the closed valve in the milk flow passageway and results in a reduction of vacuum applicable to the ends of the teats so long as the valve element 16a remains closed and the inflations contracted. At the end of this contraction period, however, the timer or other means used to control energization of the solenoid 23 reenergizes this solenoid, lifting the pilot valve 25 to its uppermost position. This closes off the chamber 21 from the atmospheric air and connects it through the opening 26 to vacuum, and to a vacuum which is an inch or two greater than that existing within the bucket because of the action of the check valve 19. As soon as this greater vacuum is fully applicable to the top of the diaphragm element 16a it raises the diaphragm to the position shown in Figure 2, and almost instantly after this expands the inflations to effect the milk withdrawal portion of the cycle of operation, during which the full vacuum existing in the bucket is applicable through the milk chamber and milk tubes to the teats.

This cycle of operation is repeated at the desired rate until a cow has been milked out, which I have found that this apparatus can effect in 2 minutes and 20 to 30 seconds. I have also found that I can time the operation of the electric pulsator in such manner as to make the withdrawal period about twice as long as the rest period (i. e. two-thirds of the time of each cycle being a milk withdrawal or full vacuum period and only one-third of the time being a rest period), with no greater or even less apparent effect on the teats (as determined by the examination of the canal and valve openings after milking) than with methods heretofore used. I have also found that I can, if desired, increase the vacuum to 16 or 18 inches to shorten the milking time further, still with no apparent increase in irritation of the teats because of the more effective rest provided by greater reduction in vacuum during this portion of the cycle.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Milking apparatus of the character described, comprising: milk withdrawing means including an inflation having a flexible body portion for receiving a teat and a milk tube leading therefrom and comprising part of a milk delivery passageway; pulsator means operatively associated with said milk withdrawing means for alternately expanding and contracting the teat-receiving portion of the inflation; means operatively associated with said milk passageway for maintaining a vacuum within at least a part of said milk passageway, said milk passageway being exterior of said pulsator means; and valve means operatively associated with said milk passageway and operative in synchronization with said pulsator means for periodically opening and closing communication between the interior of the body portion of the inflation and the part of the milk delivery passageway maintained under vacuum, the volume of the portion of said milk passageway between said valve means and said inflation being substantially equal to the volume of said inflation.

2. Milking apparatus of the character described, comprising: milk withdrawing means including an inflation having a flexible body portion for receiving a teat and a milk tube leading therefrom and comprising part of a milk delivery passageway; pulsator means operatively associated with said milk withdrawing means for alternately expanding and contracting the teat-receiving portion of the inflation; means operatively associated with said milk passageway for maintaining a vacuum within at least a part of said milk passageway, said milk passageway being exterior of said pulsator means; and valve means in said milk passageway and operative in synchronization with said pulsator means for periodically opening and closing communication between the interior of the body portion of the inflation and the part of the milk delivery passageway maintained under vacuum, said valve means closing communication at or about the commencement of inflation contraction, at least that portion of said milk passageway between said inflation and said valve being isolated from the atmosphere.

3. Milking apparatus of the character described, comprising: milk withdrawing means including an inflation having a flexible body portion for receiving a teat and a milk tube leading therefrom and comprising part of a milk delivery passageway; pulsator means operatively associated with said milk withdrawing means for alternately expanding and contracting the teat-receiving portion of the inflation; means operatively associated with said milk passageway for maintaining a vacuum within at least a part of said milk passageway; and valve means operatively associated with said milk passageway and operative in synchronization with said pulsator means for periodically opening and closing communication between the interior of the body portion of the inflation and part of the milk delivery passageway maintained under vacuum, the timing relationship being such that the teat is exposed to a substantially lower vacuum during the contracted or rest portion of the cycle of inflation operation than during the expanded portion, at least that portion of said milk passageway between said inflation and said valve being in communication only with said means for maintaining a vacuum.

4. In milking apparatus comprising milk withdrawing means including four inflations each having a flexible body portion for receiving a teat and having a source of vacuum operatively associated therewith, apparatus of the character described, comprising: a lid structure including milk delivery passageway means adapted to have said inflations connected directly thereto and means supporting a pulsator operatively associated with said milk withdrawing means for alternately expanding and contracting the teat-receiving portions of the inflations; and valve means in said lid structure operatively associated with said milk delivery passageway and operative in synchronization with said pulsator means for periodically opening and closing communication between the interior of the body portion of the inflation and part of the milk delivery passageway maintained under vacuum.

5. Apparatus of the character claimed in claim 4, including timing means associated with said pulsator whereby the expansion portion of the inflation operation cycle is considerably longer than the contraction portion.

6. In a milking system including a source of vacuum, milk withdrawing means including a plurality of inflations each having a flexible body portion for receiving a teat and communicating with a milk delivery passageway, and pulsator means for alternately expanding and contracting the teat receiving portions of the inflations, a lid of the character described for a milk receiving means having said source of vacuum connected thereto, comprising: a member having an opening therein communicating with the interior of said milk receiving means and forming a part of the milk delivery passageway; means operably associated with said inflations and said first member for delivering milk from the inflations to said member; and means associated with said member for alternately closing and opening said opening in synchronization with the contraction and expansion of said inflations.

7. In a milking system including a source of vacuum, milk withdrawing means including a plurality of inflations each having a flexible body portion for receiving a teat and communicating with a milk delivery passageway, and pulsator means for alternately expanding and contracting the teat receiving portions of the inflations, a lid of the character described for a milk receiving means having said source of vacuum connected thereto, comprising: a first member having an opening therein communicating with the interior of said milk receiving means and forming a part of the milk delivery passageway; a second member on top of said first member and sealingly engaged therewith, defining a space therebetween; means operably associated with said inflations for delivering milk from the inflations to said space between said members; and means operably associated with said first member for alternately closing and opening the opening therein in synchronization with the contraction and expansion of said inflations.

8. In a milking system including a source of vacuum, milk withdrawing means including a plurality of inflations each having a flexible body portion for receiving a teat and communicating with a milk delivery passageway, and pulsator means for alternately expanding and contracting the teat receiving portions of the inflations, a lid of the character described for a milk receiving means having said source of vacuum connected thereto, comprising: a first member having an opening therein communicating with the interior of said milk receiving means and forming a part of the milk delivery passageway; a second member on top of said first member and sealingly engaged therewith, defining a space therebetween; means operably associated with said inflations for delivering milk from the inflations to said space between said members; a flexible resilient diaphragm interposed between said members, overlying the opening in said first member and movable between a first position closing said opening and a second position opening said opening; and means for moving said diaphragm between said first and second positions in synchronization with the contraction and expansion of said inflations.

9. A lid of the character described in claim 7 wherein there is an opening in said second member over said diaphragm and the pulsator means is mounted directly thereon and in communication with said last mentioned opening to effect movement of said diaphragm between said first and second positions.

References Cited in the file of this patent

UNITED STATES PATENTS

| | | |
|---|---|---|
| 784,780 | Burrell | Mar. 14, 1905 |
| 918,438 | Gillies | Apr. 13, 1909 |
| 1,043,013 | Hulbert | Oct. 29, 1912 |
| 1,218,125 | Sharples | Mar. 6, 1917 |
| 1,307,539 | Dinesen | June 24, 1919 |
| 1,354,666 | Lane | Oct. 5, 1920 |
| 1,942,882 | Sutherland | Jan. 9, 1934 |
| 2,254,092 | Schmitt et al. | Aug. 26, 1941 |
| 2,254,093 | Schmitt et al. | Aug. 26, 1941 |

FOREIGN PATENTS

| | | |
|---|---|---|
| 110,006 | Australia | Mar. 5, 1940 |
| 111,686 | Australia | Oct. 2, 1940 |